United States Patent [19]
Ridgeon

[11] Patent Number: 4,508,248
[45] Date of Patent: Apr. 2, 1985

[54] WHEELED APPLICATOR FOR LIQUIDS

[75] Inventor: Paul W. Ridgeon, Haslingfield, England

[73] Assignee: Walkover Limited, Cambridgeshire, England

[21] Appl. No.: 402,894

[22] Filed: Jul. 29, 1982

[30] Foreign Application Priority Data

Aug. 1, 1981 [GB] United Kingdom ................ 8123634

[51] Int. Cl.$^3$ ........................ A01C 23/04; B05B 3/18
[52] U.S. Cl. .................................... 222/623; 239/157
[58] Field of Search ............. 222/623, 617, 621, 613, 222/616, 618, 624; 239/157, 172

[56] References Cited

U.S. PATENT DOCUMENTS

| | | | |
|---|---|---|---|
| 2,013,370 | 9/1935 | Tugart | 239/157 X |
| 2,491,818 | 12/1949 | Lapp | 239/157 |
| 2,504,787 | 4/1950 | Bailey | 222/623 X |
| 2,963,226 | 12/1960 | LaRoque | 239/157 |
| 3,381,861 | 5/1968 | Stein | 239/157 X |
| 4,296,875 | 10/1981 | Borglum | 239/157 X |

FOREIGN PATENT DOCUMENTS 19573 of 1909 United Kingdom ................ 239/157

*Primary Examiner*—Stanley H. Tollberg
*Assistant Examiner*—Frederick R. Handren
*Attorney, Agent, or Firm*—Spensley, Horn, Jubas & Lubitz

[57] ABSTRACT

An applicator for spraying material such as fertilizer on a vegetative surface for use in domestic horticultural purposes. The applicator has a pump for supplying liquid to spray nozzles, which pump is driven on rotation of the applicator wheels. The applicator is normally pushed over the ground using a handle. The pump drive axis and wheel axis are co-axial and the wheel is supported on a single one piece shaft which also forms the drive shaft for the pump without an intermediary coupling. This provides a compact and efficient machine. The pump is mounted on a bearing housing for the shaft into which housing and a bearing housing on the other side of the machine fit the ends of the handle, giving a strong handle support.

8 Claims, 4 Drawing Figures

WHEELED APPLICATOR FOR LIQUIDS

BACKGROUND OF THE INVENTION

This invention relates to an applicator intended to apply material for example fertilizer (normally liquid but possibly powdered) to surfaces or vegetative or other biological matter associated with a surface. Generally the device will find use in the domestic horticultural or agricultural fields but may be used for other purposes. Liquid spray applicators have been made which employ drive motors, power takeoffs from tractors or pressurized tanks; those available are expensive and beyond the means of the average gardener or small groundsman.

This invention is concerned with applicators having coupling means between an applicator wheel and the pump so that as the wheels rotate the pump is driven. The forward motion of the applicator is normally provided by a pedestrian operator and the forward rotation of the wheels serves to drive the pump. However, the forward motion may be provided by a small motor. Such applicators are known. For example, British Patent Specification Nos. 862020 and 1489747 both show applicators having a pump driven from ground wheels. However, in one case these are driven by a chain and counter-shaft and in another case by a chain and sprocket drive which is cumbersome and impractical in a small applicator.

SUMMARY OF THE INVENTION

An object of the present invention is to provide a compact efficient and relatively cheap applicator which at least in its preferred forms will withstand rough handling and shock loads.

The present invention provides an applicator comprising a chassis supported on wheel members on which it can be moved over the ground, a container for liquid or other material arranged to be supported on the chassis, a rotary displacement pump having an inlet and an outlet for material to be pumped, means arranged to connect the pump inlet to the container, the pump having a drive coupled to a wheel member so that as the wheel member rotates the pump supplies material from the container under pressure through its outlet and in which the pump drive axis is co-axial with the wheel member axis, the wheel member preferably being mounted on a single shaft which extends into the pump to form the drive member thereof.

Such an arrangement eliminates the prior elaborate couplings between the wheel member and the pump and allows one to achieve an accurate co-axial relationship between the pump and wheel member leading to greater efficiency in the pump. This arrangement also achieves a very compact machine thus saving in space and cost in the production of the applicator.

The bearing housing for the bearing of the drive shaft is preferably made of very strong plastics and/or plastics and glass fibre material, this bearing housing being connected to the chassis and forming the mounting means both for the wheel member and the pump itself, which is only connected to the chassis via the bearing housing. This arrangement again leads to accurate alignment of the pump and wheel member. The pump may be mounted in cantilever manner and with advantage there is sufficient flexibility in the part of the bearing housing to which the pump is attached to achieve an arrangement in which bending shock loads and torsional loads on the pump will be transmitted in main directly to the drive shaft rather than through the bearing housing.

The applicator preferably has two main wheel members on which it is supported. Each of these may be independently coupled to an individual pump in a similar manner to that described above so as to double the output. However, where only one pump is provided and coupled to one wheel member, with advantage the other wheel member is supported by a bearing and bearing housing secured to the chassis, which housing is similar to the bearing housing described above except that it does not need means for connecting it to a pump and does not require the drive shaft to extend therethrough into the pump.

Normally handle means will be provided for pushing the applicator over the ground. With advantage the handle means are also connected to the bearing housings so that shock loads on the handle means are transmitted to the bearing housings and the wheels without a substantial part thereof passing through the chassis.

The chassis itself is preferably of moulded plastics material which is sufficiently strong to carry the container and transmit normally envisaged shock loads through the bearing housings to the wheels.

BRIEF DESCRIPTION OF THE DRAWINGS

One embodiment of applicator, in accordance with the invention, will now be described, by way of example only, with reference to the accompanying drawings of which.

DETAILED DESCRIPTION OF PREFERRED EMBODIMENT

Figure 1:
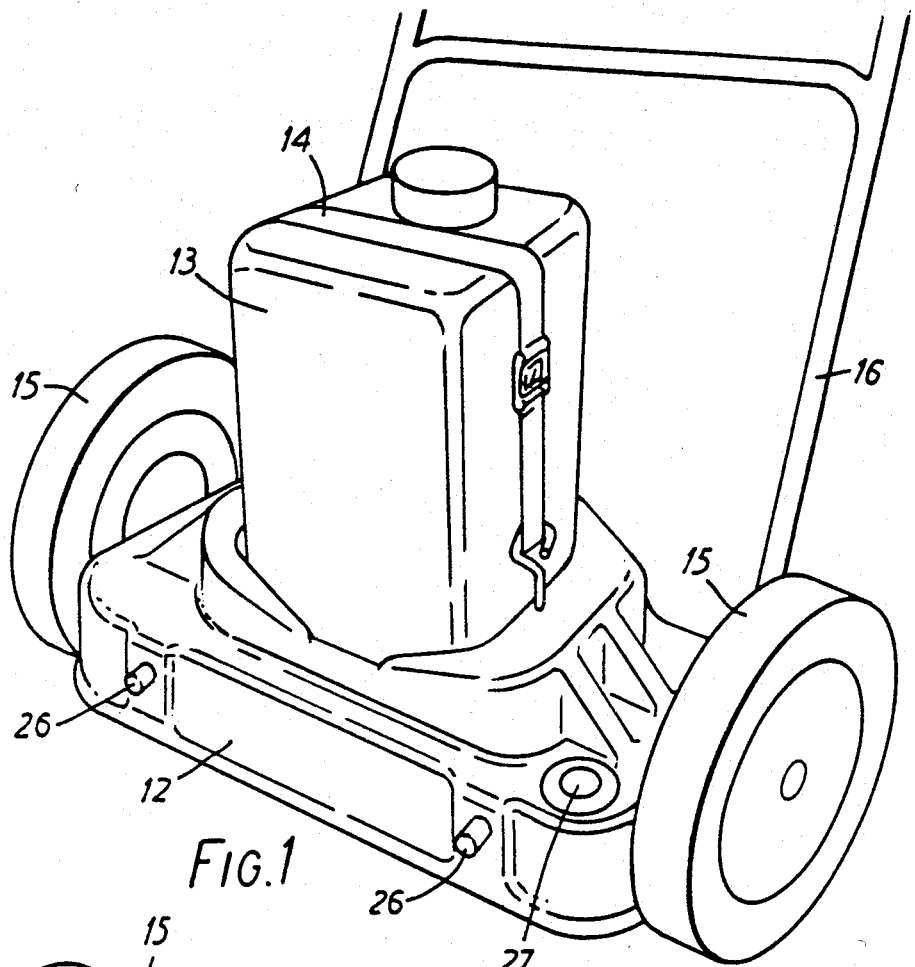
FIG. 1 is a perspective view from the front and one side of the applicator.
Figure 2:
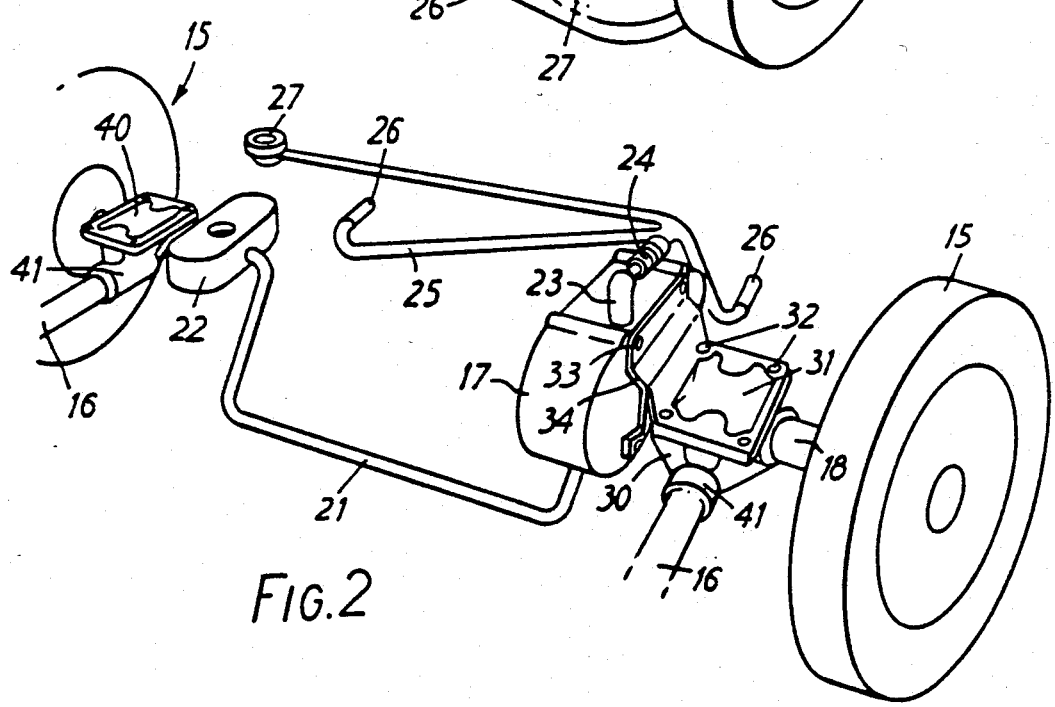
FIG. 2 is a perspective view of the pump, wheel means and liquid pipe means with the main chassis and container removed.

The applicator comprises a main chassis 12 on which is mounted a container 13 for material to be applied. The container is held in position on the chassis by a strap 14. The chassis is supported on two main wheels 15 on which it may be pushed over the ground. Handle means 16 are provided for pushing the applicator forwards. A pump 17 is connected to one of the wheels 15 to be driven by rotation of that wheel via a drive shaft 18. The pump has an inlet 20 connected by tubing 21 to a filter unit 22. The liquid delivery from the container is achieved via a seal between the container and the chassis and a penetration in the chassis which corresponds with a similar penetration (not shown) in the bottom on the container. The filter unit 22 is mounted under this penetration and consists of a moulded filter housing with a fine filtration membrane (not seen) within it. The pump has an outlet 23 which is connected via a pressure release in-line valve 24 and tubing 25 to spray nozzles 26 mounted on the front of the chassis. The spray nozzles face downwards to discharge the liquid onto the ground. A liquid attachment in the fluid line leads to a pressure gauge 27 which gives an indication of the most suitable walking speed for the applicator user.

Figure 3:
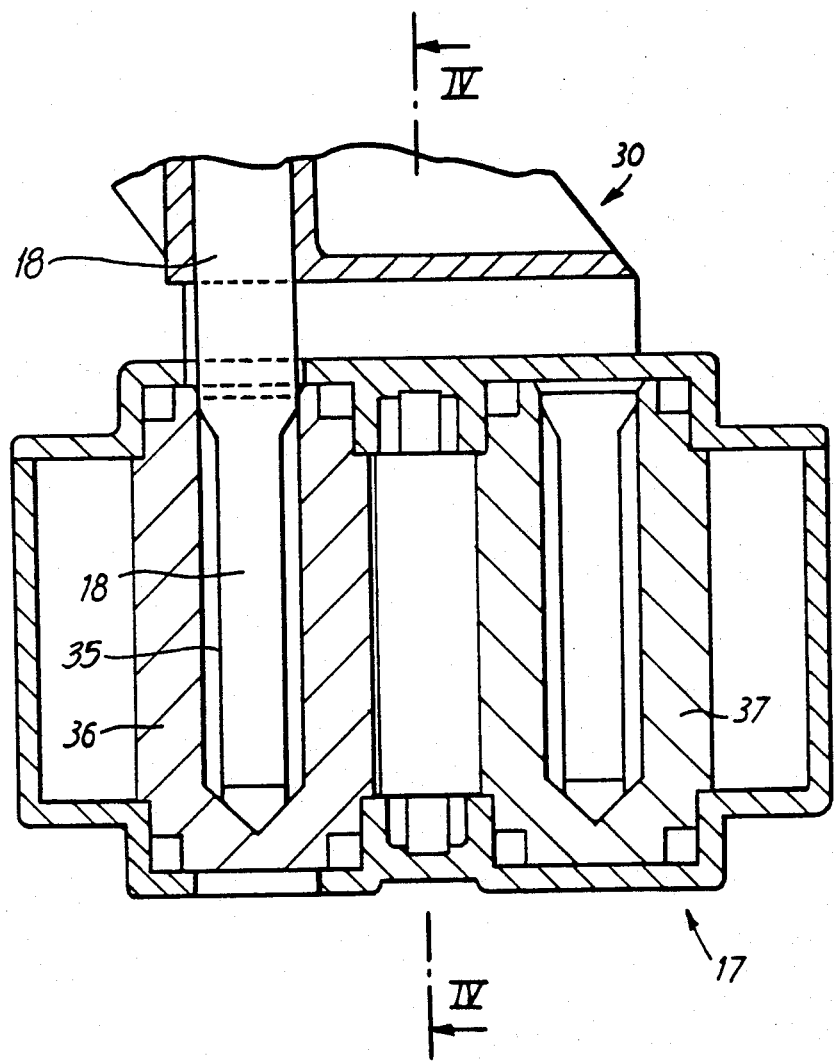
FIG. 3 is a sectional view through the pump.
Figure 4:
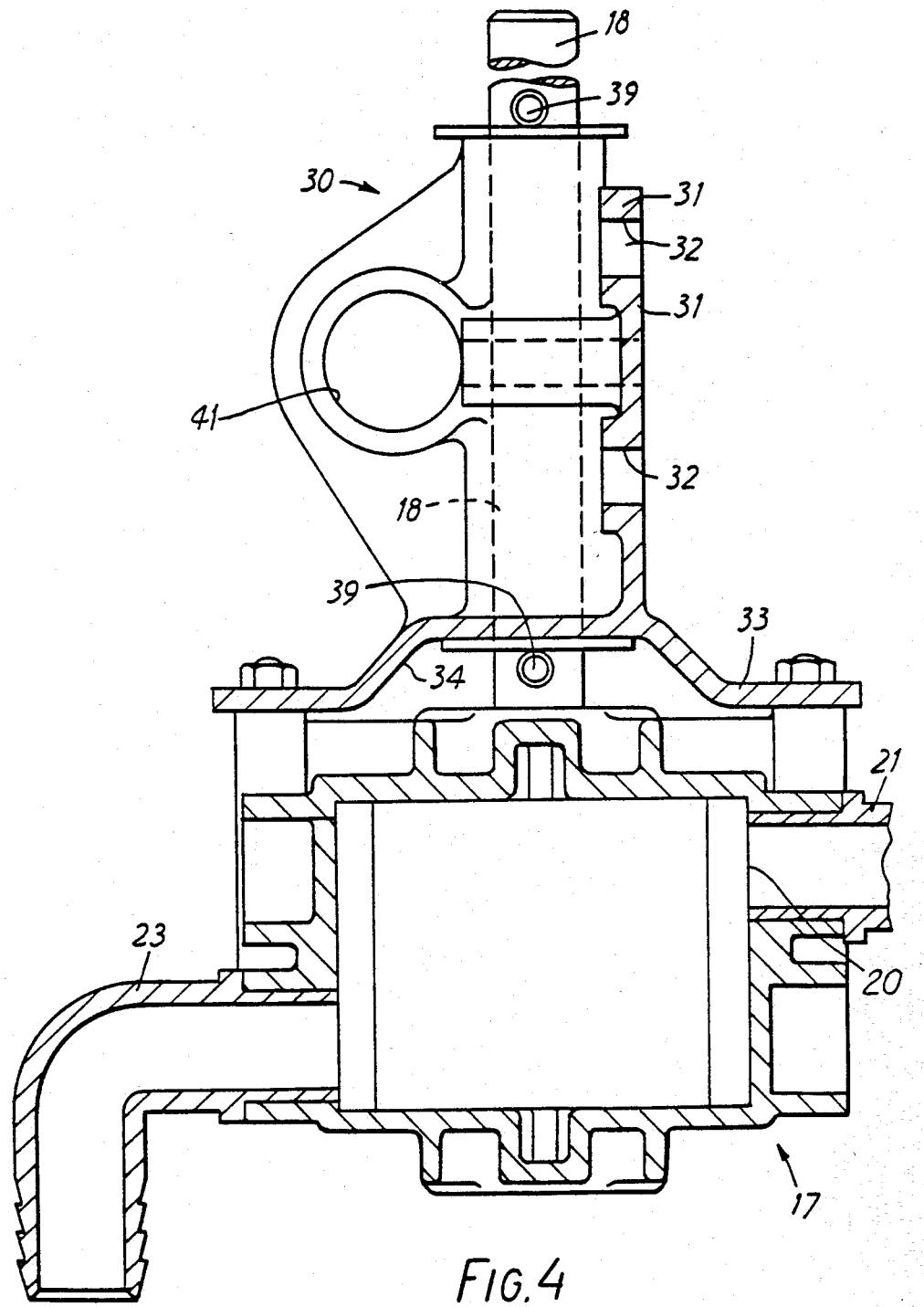
FIG. 4 is a section on the line IV—IV of FIG. 3 additionally showing the bearing housing and drive shaft.

The bearing assembly for the drive shaft 18 comprises a bearing housing 30 moulded from high grade plastics or plastics and fibre-glass material and having a first plate-like portion 31 provided with four fixing holes 32 for securing it to the chassis. A second portion 33 of the bearing housing extends transversely to portion 31, includes sloped portions 34 and is provided with fixing holes for bolting the pump 17 thereto. The pump is thus mounted in a cantilever manner to the bearing housing with substantially no play between it and portion 33 but is not otherwise secured to the chassis. The drive shaft 18 not only forms the wheel axle but extends through the bearing directly into the pump to form the drive member thereof with no intervening couplings. The wheel and pump drive axes can therefore be made accurately co-axial. The pump shown is a gear pump although this could be some other form of rotary displacement pump. As shown in FIG. 3 the end of the drive shaft has flattened sides 35 to engage with a gear 36 meshing with a gear 37 both mounted in the pump housing 38.

The cantilever mounting and sloped portion 34 provide sufficient flexibility in the pump mounting that bearing shock loads on the pump and torsional loads from the pump will in main be transmitted through the drive shaft 18.

The bearing for the drive shaft extends substantially the full width between the pump and edge of the chassis where the drive shaft penetrates through the chassis wall. Removable pins 39 hold the shaft and wheel in the required positions.

The applicator can be fitted with either one pump or with a similar pump arranged on the other side and attached in a similar manner to the other wheel to increase the output of the applicator. In this example only one pump is provided and on the other side is a bearing assembly 40 similar except that it has no means 33 for mounting the pump thereto and the drive shaft does not extend right through it into a pump. Both the bearing assemblies 30, 40 are provided with socket means 41 for receiving the ends of the handle means 16. These handle means penetrate through the rear of the chassis and are prevented from chafe by means of rubber or plastics grommets set into the skirt of the chassis. The forward ends of the handles are located in the sockets and fixed in position by means of easily removable pins not shown. The handle means is a two part tubular assembly in order to ensure a suitable operator height and to enable it to be broken down for compact packing and transportation. Each side of the handle means has a small wheel not shown pivotally attached thereto and provided for marking purposes to ensure that when is use a guide-line can be marked on the turf. These may for example be spaced apart by 600 mm. The wheels are spring loaded by tension means into the marking position but can be stowed under spring tension out of contact with the ground by means of chain members when marking is not required. The small wheels can also provide additional support for the assembly.

The wheels 15 are arranged to have sufficient weight to ensure a friction drive even with the container almost empty and the shape and size of the wheels can be adjusted to suit different applications.

In operation the machine will begin to pump liquid to accurately predetermined conditions as soon as it is pushed in a forward direction assuming liquid is in the container. The volume of liquid sprayed is directly dependent on the forward speed. Should it be desired to move the machine without pumping liquid through the nozzles the machine can be towed backwards and liquid will not be discharged from the nozzles. As an example, at a normal walking speed the pump will rotate at about 72-75 rpm and produce an output of at least 2 liters per minute with a pressure of 1.1 bar.

What is claimed is:

1. An applicator comprising a chassis, wheel members supporting the chassis and on which it can be moved over the ground, the wheel members having axes of rotation, a container for liquid or other material arranged to be supported on the chassis, a rotary displacement pump having a rotor mounted on a pump drive shaft for rotation in a pump housing, having an inlet and an outlet for material to be pumped, connection means arranged to connect the pump inlet to the container, the pump drive shaft being common with the shaft on which one of said wheel members is mounted so that as the wheel member rotates the pump supplies material from the container under pressure through its outlet, and including a bearing for the drive shaft located in a bearing housing, means securing the bearing housing to the chassis, and mounting means mounting the pump housing to the bearing housing such that the pump is only secured to the chassis through the bearing housing, so that loads transmitted between the wheel members and the chassis are not transmitted through the pump.

2. An applicator according to claim 1 in which the mounting means mount the pump in a cantilever manner.

3. An applicator according to claim 1 in which there are two wheel members and two pumps each coupled to one of the wheel members in a similar manner.

4. An applicator according to claim 1 in which there are two main wheel members, the pump being coupled to one via a shaft passing through a first bearing housing connected to the chassis and the other being mounted on a shaft passing through a second bearing housing connected to the chassis.

5. An applicator according to claim 4 including handle means for pushing the Applicator over the ground, the handle means being connected to the first and second bearing housings so that the majority of shock loads on the handle means are transmitted to the first and second bearing housings without a substantial part passing through the chassis.

6. An applicator according to claim 1 in which the pump is a gear pump.

7. An applicator comprising a chassis, wheel members supporting the chassis and on which it can be moved over the ground, the wheel members having axes of rotation, a container for liquid or other material arranged to be supported on the chassis, a rotary displacement pump having a pump housing defining an inlet and an outlet for material to be pumped, connection means arranged to connect the pump inlet to the container, the pump having a drive shaft coupled to and coaxial with one of said wheel members so that as the wheel member rotates the pump supplies material from the container under pressure through its outlet, and including a bearing for the drive shaft located in a bearing housing, means securing the bearing housing to the chassis, and mounting means mounting the pump housing to the bearing housing such that the pump is only secured to the chassis through the bearing housing and in which the part of the bearing housing to which the pump is mounted is sufficiently flexible that the majority of bending shock loads and torsional loads on the pump will be transmitted directly to the drive shaft rather than passing through the mounting.

8. An applicator according to claim 7 including a single shaft on which said wheel member is mounted and which extends into the pump to form the drive shaft thereof.

* * * * *